Sept. 2, 1941. M. A. QUINLAN 2,254,664
SANCTUARY LAMP
Filed July 29, 1939 2 Sheets-Sheet 1

Michael A. Quinlan Inventor

Charles L. Reynolds
Attorney

Sept. 2, 1941.  M. A. QUINLAN  2,254,664
SANCTUARY LAMP
Filed July 29, 1939  2 Sheets-Sheet 2

Inventor
Michael A. Quinlan
By Charles L. Reynolds
Attorney

Patented Sept. 2, 1941

2,254,664

UNITED STATES PATENT OFFICE 2,254,664

SANCTUARY LAMP

Michael A. Quinlan, Chehalis, Wash.

Application July 29, 1939, Serial No. 287,313

8 Claims. (Cl. 240—13)

The present invention relates to sanctuary lamps, and the principles of the invention are adapted to such lamps whether the fuel employed be an oil or a candle.

In such lamps one of the problems is to obtain the maximum period of burning, which in turn implies a small flame, yet without danger of extinguishment of the flame. Obviously, if the period of burning of a given quantity of fuel can be lengthened, less fuel need be employed to obtain a given period of burning, as seven days, with consequent saving of fuel or lessening of the cost of the fuel.

One of the difficulties in attaining the above ends with such lamps, as heretofore constructed, has been that they are subject to changing conditions during the period of burning. The church or other edifice in which they are employed may be at one time thoroughly warmed up, and within a few hours may be quite cold. With combustion conditions established on the basis of reasonably satisfactory operation when the temperature is low, the same lamp under identical conditions, will produce excessively rapid fuel consumption at more elevated temperatures; if the conditions are established on the basis of satisfactory operation at summer temperatures, it becomes difficult to maintain an adequate rate of combustion when the edifice is cold. In practice the conditions of fuel consumption are usually gauged to the most adverse conditions, to burn at temperatures sometimes considerably below 0° centigrade, with the result that under more favorable temperature conditions the rate of fuel consumption is excessive.

These difficulties, I have discovered, are due primarily to failure to maintain substantially uniform temperature conditions immediately surrounding the flame and the fuel which is about to be consumed, and I have discovered that by proper control of the temperature of the incoming air for combustion, and of the escape of the gases of combustion, the temperature in the critical space, that which immediately surrounds the flame and the pool of liquid fuel which feeds the flame, may be maintained substantially uniform under all temperature conditions, leading to the ultimate object that the consumption of fuel may be more economical and at a more uniform and dependable rate.

It is accordingly the principal object of my invention to provide a lamp so constructed as to attain the above ends.

More specifically it is an object of my invention to provide a sanctuary lamp so constructed that the incoming air for combustion is necessarily heated by heat from the flame of the lamp, and thereby serves to maintain warm the exterior of the lamp and to prevent access to its interior, that is, to the flame, of air which has not been so warmed, all to the end that the air which reaches the flame reaches it at a substantially uniform temperature, regardless of external temperature conditions, that is, conditions within the edifice and immediately surrounding the lamp.

It is a further object of the invention to provide damper means for the control of the incoming air for combustion, or for the control of the outflowing gases of combustion, or both, to the end of better conserving and employing the heat of the flame.

A further object is attained by such temperature control, namely, that the fuel container is kept sufficiently warm at all times that changes in its temperature are but slight, and do not affect the temperature of the air which enters it, passing to the flame, nor is the temperature of the fuel container ever low enough to cause congelation of wax upon its surface.

The lamp which incorporates my invention is shown in the accompanying drawings in various different specific forms, all designed to carry out and attain the objects of the invention as set forth above, and with these objects in mind my invention comprises the novel parts, and the novel combination and relative arrangement thereof, as shown in the accompanying drawings, described in this specification, and as will be more particularly defined by the claims which terminate the same.

Figure 2:
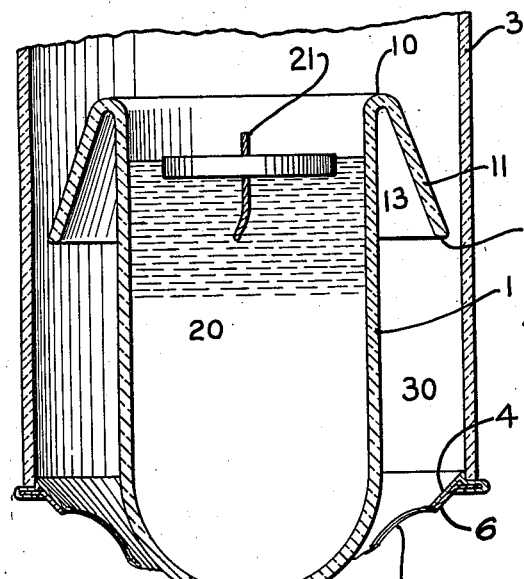
Figure 2 is a fragmentary axial section through such a lamp embodied in a somewhat modified form.

Such a lamp normally incorporates a fuel container 1, wherein is contained a candle 2 or, in the form shown in Figure 2, a body of oil, represented at 20. In such lamps the fuel container 1 is usually of clear translucent glass, and it is customary to incorporate in such lamps an external enclosure 3, which is of ruby glass. The container 1 with its candle 2 and the enclosure 3 are suitably connected, and the lamp as a whole may be of the stand type or of the hanging type. The stand type is here illustrated, in which case the base 4 includes a cup-like support 41 for the fuel container 1, and a ledge 43 for the enclosure 3, to hold the latter spaced outwardly surrounding the container 1. The whole is finished at the top by a circle or band 53, resting upon the lip of the enclosure 3, and is finished with a cap or dome-like enclosure 5, which may be suitably ornamented, if desired, or surmounted by an ornamented cap.

The elements so far described, in one form or another, have constituted part of such sanctuary lamps as heretofore provided. My lamp, however, differs from prior lamps primarily in the manner of controlling, guiding and supplying the air for combustion, and the escape of the gases of combustion, to the end that the flame and the immediately surrounding space is protected against changes of temperature, as also the wall of the fuel container itself, all in a simple and inexpensive manner.

Figure 1:
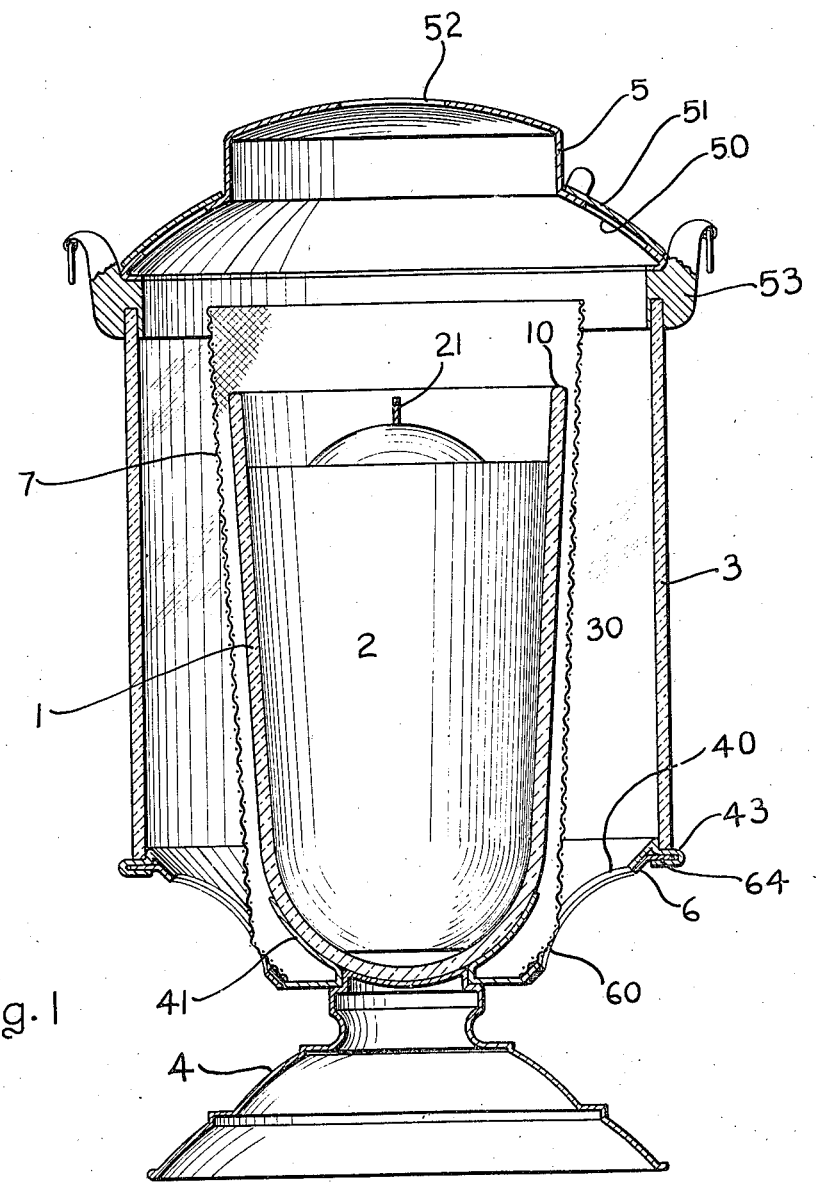
Figure 1 is a vertical axial section through such a lamp, in one form.

In the form shown in Figure 1 the base is provided with apertures 40 for the admission of air into the space 30 between the enclosure 3 and the fuel container 1. The amount of air supplied may be regulated and controlled by damper means, if desired, although this is not an essential feature of my invention, broadly considered. Such damper means are shown at 6, having openings 60 which may be brought more or less into registry with the openings 40, to control the supply of air from the exterior into the air space 30. The damper 6 is suitably and adjustably supported, as by a flange 64, whereby it may be rotatively supported from the flange 43 of the base 4.

Flame at the wick 21 tends to heat the lip 10 of the fuel container 1 by radiation, to some extent by convection currents, and to some extent by conduction through the pool of melted wax (or liquid oil) at the top of the candle. It follows that the air, rising through the space 30 and passing over the upper end of the container 1 and over its lip 10, will become heated during such passage. However, unless the flow of air through the lamp is small in amount the air will not remain in the heating zone for a length of time sufficient for its temperature to be raised uniformly and always to a substantially constant value where considerable variation in external temperature occurs. If such flow is kept constant and limited to a small volume by control of the air inlet or of the opening provided for the escape of combustion gases, or both, the air will be heated to substantially the same temperature before coming into the combustion chamber regardless of external temperature, for it will be subjected to heating action for a sufficient length of time during passage through the air space 30 so that despite wide variations in temperature of the entering air it will finally reach very nearly the same temperature in each case by the time it reaches the flame. By assuring a supply of air of constant volume and of substantially uniform and constant temperature to the flame, it can be maintained very small without danger of being extinguished, and the maximum economy of fuel consumption is thereby obtained. It is therefore possible, merely by regulation of air inlet and combustion gas escape to maintain the flame reasonably low and to slow down the rate of admission of air to the point that it is materially warmed merely by passing over the exterior of the container 1, before it reaches the flame at the wick 21, and, in consequence, the enclosure 3 is to some degree heated from the interior by the warmed air passing over it.

Preferably however, means are provided to assist in warming the air more rapidly and to a higher degree than can be accomplished merely by its passage over the exterior of the glass fuel container 1. Such means might be considered the equivalent of a radiator, for they absorb heat from the flame and transmit it to the incoming air. In the form shown in Figure 1 this radiator consists of a wire mesh screen 7 which, of course, is translucent. This screen is interposed in the passage 30 between the fuel container 1 and the enclosure 3. Its upper end preferably extends well above the lip 10 of the container and its lower end preferably is so arranged that the air entering at 40 must pass over and through the screen before it can spill over the lip 10 and into the interior of container 1. The screen 7 is heated by radiation from the flame and by conduction from the container 1, as also to some extent, although very little, by convection, because the flame is steady and there is very little, if any, convection current except directly upwardly. The screen being a good conductor of heat, the heat is conducted from its upper end downwardly within the air passage 30, and thus the entering air passing over and through the screen is necessarily warmed more rapidly and more thoroughly and to higher degree than it would be warmed merely by passage over the container 1.

The air being thus warmed, it reaches the flame at 21 at substantially constant temperature, regardless of the external temperature conditions, and being warm as it passes upward through the passage 30 it tends to warm the enclosure 3, as also does heat radiated directly from screen 7. Air moving upward through the outer zone of the passage 30 into the top of the container and about the wick 21 has therefore not been chilled by contact with the inner surface of the enclosure 3, so that it is substantially the same temperature as air which has moved up through the inner zone of the passage 30.

Figure 5:
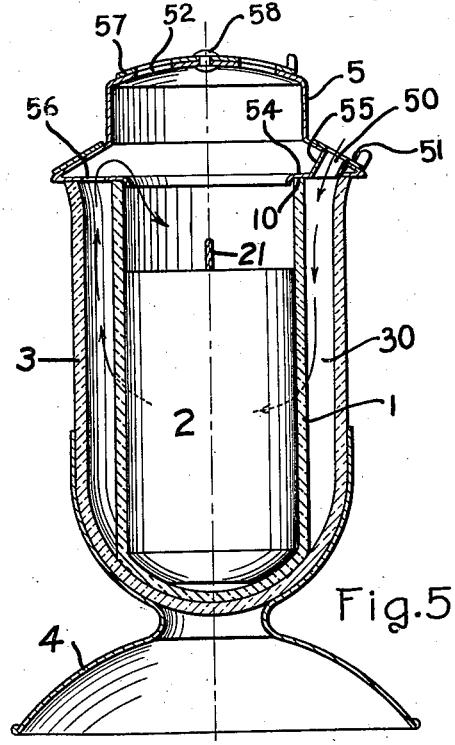
Figure 5 is an axial sectional view through a further modified form.

The action thus described is further controlled by providing at 52 in the dome 5 a relatively small aperture for the escape of gases of combustion, this being centrally located immediately above the wick 21. The size of this aperture may, if desired, be variable by damper means such as are shown in Figure 5 for instance. The cap 5 is also provided with apertures 50 controlled by a damper 51, so that, for this or other forms of the device, the air for combustion may be admitted through the openings 50. Usually when the air for combustion is admitted through the base, the openings at 50 remain closed.

Much the same effect may be achieved in other ways, as for instance in the manner shown in Figure 2. Here the fuel container 1 is provided with a skirt 11 depending from its lip 10 and extending downward within the air space 30. Air entering at 40 and passing upward through passage 30 must pass the lower end 12 of the skirt 11 before it can pass over the lip 10 and have access to the floating wick 21. The result is that air trapped within the space 13 between the skirt 11 and the container 1 becomes heated, and as it expands it is gradually drawn upward, outside the skirt, by the air passing outside the lower termination 12 of the skirt, warming and mingling with that air. Such air is replaced by a small quantity of cooler air passing upward through the air passage 30. There is, in effect, aspiration of warm air from the space 13. This warm air and the cooler air with which it mingles are further warmed by passing upward over the skirt 11, which is in heat conducting relation to the fuel container 1, until finally when it reaches the flame at 21, it is thoroughly warmed. The action otherwise is substantially the same as that previously described.

Figure 4:
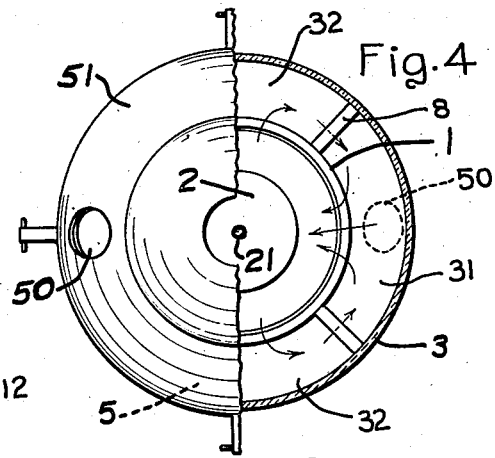
Figure 4 is in part a top plan view and in part a transverse section through the form shown in Figure 3.
Figure 3:
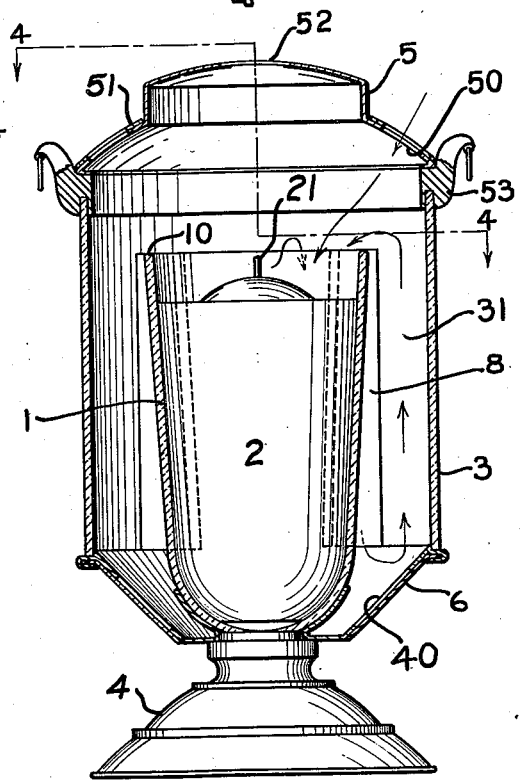
Figure 3 is a similar axial sectional view of a further modification.

In the form shown in Figures 3 and 4 the air enters through the cap 5 and the air inlet apertures 40 are closed by the damper 6. The interior arrangement is somewhat different, to produce an aspirating and circulating effect about the container 1. To this end the space between the container 1 and the enclosure 3 is divided by radial partitions 8 into cells or spaces extending lengthwise of the lamp but communicating at the top and bottom of the fuel container. The air inlet apertures 50 are now open, and air entering at this point is thrown inwardly; as it spills over the lip 10, it tends to draw air from the space 31. Air can only enter this space 31 from the bottom, and to enter this space must be drawn from the space 32, and can only enter space 32 from the top and be drawn downward therethrough. Since there is thus established a circulation of air downwardly through the space 32 and upwardly through the space 31, this air becomes thoroughly heated from contact with the fuel over the lip 10 that this air is of uniform temperature regardless of the exterior temperature. The lamp in this form normally has a relatively small number of air inlet apertures 50, which register with the passages 31, and there are no air inlet passages in the cap registering with the air passages 32, whence results the circulating effect described.

In the form shown in Figure 5 means are provided to require positively that the incoming air pass downward and about the heated fuel container 1 before it is permitted to pass over the lip 10 thereof and into its interior for access to the flame. In Figure 5 the cap 5 is provided with air inlet openings 50 as before. Interiorly it is provided with a flange 54 which spans the air space 30, and from each air inlet aperture 50 leads a conduit 55 through the flange 54, so that entering air must pass beneath the flange 54 and hence beneath the lip 10 of the container 1, and this air may only pass over the lip 10 through apertures 56 in the flange 54, as is indicated by the arrows. By properly spacing the apertures 56 from the air passages 55 it is insured that incoming air will pass downwardly about the fuel container 1 until it is sufficiently warmed that it will rise through the apertures 56 and then spill over into the fuel container 1. The damper 51 as before controls the effective size of the air entrance apertures 59. Likewise a damper 57, pivoted at 58, controls the effective size of the apertures 52 for the escape of the hot gases of combustion.

Actual tests of candles in such a lamp have shown that candles that will normally burn perhaps ten hours in excess of seven days, at the most, may be made to burn as long as nine or ten days, and that such results may be obtained under extremes of temperature conditions.

What I claim my invention to be:

1. A sanctuary lamp comprising a translucent fuel container open at its top, a cap over the open top of said container, centrally apertured for the escape of gases of combustion, means defining an air inlet opening admitting to the interior of the fuel container, and damper means operable to regulate the size of the combustion gas escape aperture.

2. A sanctuary lamp comprising a translucent fuel container open at its top, a translucent enclosure spaced about the fuel container to define an air space, in which the air is heated by contact with the heated fuel container, and heats the enclosure, a cap over the enclosure, centrally apertured for the escape of gases of combustion, and further apertured outwardly of such central aperture to define an air inlet opening admitting to the air space, damper means operable to regulate the size of the air inlet opening, and further damper means operable independently of said first damper means to regulate the size of the combustion gas escape aperture.

3. A sanctuary lamp comprising a translucent fuel container open at its top, a translucent enclosure spaced about said fuel container to define a preheating air space, partition means separating the combustion space within the open top of said fuel container from such preheating air space, and apertured for passage of air therefrom into the combustion space, means defining an air inlet aperture communicating directly and solely with the preheating air space beneath said partition means, and means defining an outlet for combustion gases from the top of the fuel container.

4. A sanctuary lamp comprising a translucent fuel container open at its top, a translucent enclosure spaced about the container to define a preheating air space, means communicating directly between the exterior of the enclosure and such preheating air space, defining an air inlet to the air space, means remotely spaced circumferentially of said container from said first means and communicating between such preheating air space and the interior of said fuel container, and means defining an outlet for combustion gases from the top of the fuel container.

5. A sanctuary lamp comprising a translucent fuel container open at its top, a translucent enclosure spaced about the container to define a preheating air space, means defining an air inlet to the air space, partition means separating such air space from the combustion space within the open top of the fuel container, having therein an aperture remote from said air inlet means for passage of air from such preheating air space into such combustion space, and restraining exit of air from the preheating space between said air inlet means and such aperture, thereby to require movement of air over a substantial distance through such preheating air space prior to entry into such combustion space, and means defining an outlet for combustion gases from the combustion space.

6. A sanctuary lamp comprising a translucent fuel container open at its top, a translucent enclosure spaced about the container to define a preheating air space, a cap over the enclosure closing the top of the air space and constituting partition means separating such preheating air space from the combustion space within the open top of the fuel container, said cap being centrally apertured for the escape of combustion gases, means communicating directly between the exterior of the enclosure and such preheating air space beneath said partition means and defining an air inlet into the air space, and said cap partition means having an aperture therein remote from said air inlet means defining a passage for movement of air from said preheating air space into the top of the fuel container.

7. A sanctuary lamp comprising a translucent fuel container open at its top, a translucent enclosure encircling and spaced from said fuel container to define a preheating air space, a cap over the enclosure centrally apertured for the escape of gases of combustion from the combustion space within the open top of said fuel container, and further apertured outwardly of said central aperture to define an air inlet opening, and partition means interposed between said fuel container and said enclosure, having an air inlet aperture to such preheating space beneath the air inlet opening in said cap and in registry therewith, and having a further aperture wholly beneath and in registry with an imperforate portion of said cap, defining an air outlet opening from such preheating space to such fuel container combustion space.

8. A sanctuary lamp comprising a translucent fuel container open at its top, a translucent enclosure encircling and spaced from the container to define a preheating air space, a cap over the enclosure closing the top of the air space and constituting partition means separating such air space from the combustion space within the open top of the fuel container, said cap being centrally apertured for the escape of gases of combustion, also having an aperture communicating directly and solely between the exterior and such preheating air space beneath said partition means, and having a further aperture communicating between such preheating air space and the combustion space within the top of the fuel container.

MICHAEL A. QUINLAN.